C. B. TOWER.
APPARATUS FOR BURNING HYDROCARBONS.

No. 179,431. Patented July 4, 1876.

WITNESSES
C. W. Tuttle
E. A. Stock.

INVENTOR
C. B. Tower
by J. H. Adams
Att'y.

UNITED STATES PATENT OFFICE.

CLEMENT B. TOWER, OF HYDE PARK, MASSACHUSETTS.

IMPROVEMENT IN APPARATUS FOR BURNING HYDROCARBONS.

Specification forming part of Letters Patent No. 179,431, dated July 4, 1876; application filed November 3, 1875.

*To all whom it may concern:*

Be it known that I, CLEMENT B. TOWER, of Hyde Park, in the county of Norfolk and State of Massachusetts, have invented an Improved Apparatus for Burning Hydrocarbons, of which the following is a specification:

The object of my invention is to produce an apparatus for burning hydrocarbon oils for heating purposes, which shall combine simplicity and economy of construction, efficiency, and durability; and the invention consists in the employment of a body of compact porous cement, or equivalent substance, placed in and firmly attached to a suitable receptacle, under which body of cement is a chamber or space for the reception of the hydrocarbon, which is supplied to the said chamber by means of a pipe connected with a reservoir, suitably arranged for the purpose. The body of cement which constitutes the burner is provided with one or more vertical air-passages, for the supply of air to the flame on the surface of the cement, the whole to be surrounded with a casing, having a space between it and the burner, to admit of a suitable supply of air.

Figure 1:
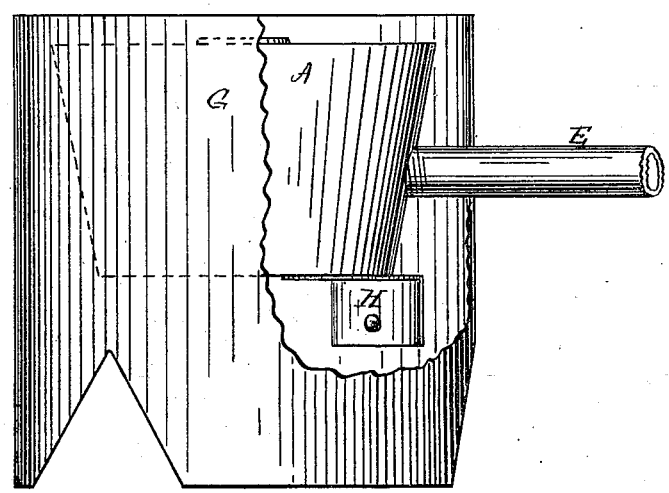
Figure 3:
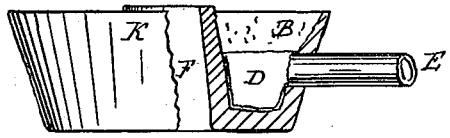
Figure 2:
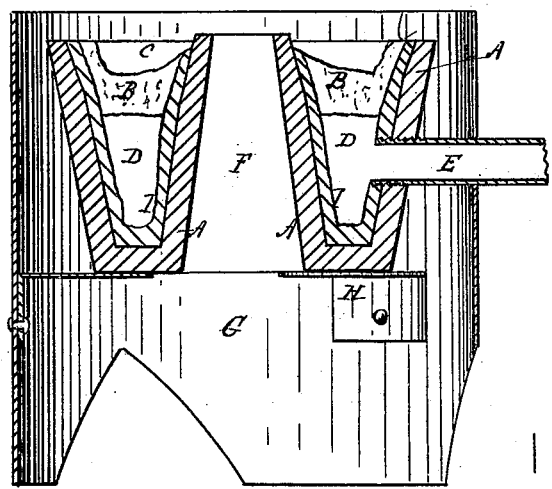

Referring to the drawings, Figure 1 represents an apparatus embodying my invention with a portion of the casing broken away. Fig. 2 is a transverse vertical section of the same. Fig. 3 represents a modification of my apparatus.

A represents a circular metallic cup or vessel, provided with a central opening, F, which projects slightly above the level of the outer sides of the cup or vessel A. On the inner surface of the vessel A is a lining of clay, designated by I, Fig. 2. In the upper part of the vessel A is placed a compact body of cement or other porous substance, B, which will admit of the passage through the same of hydrocarbon oils. Beneath this porous substance is a chamber or space, D, for the reception of the hydrocarbon, which is supplied to the said chamber by means of a pipe, E, leading from a suitably-arranged reservoir or fountain. G represents a casing, which surrounds the vessel A, there being a sufficient space between it and the casing for the supply of air to the flame. The casing G may, in some cases, be dispensed with, if found desirable. Any other form than a circular one may be given to the vessel A, if desirable. Where a large heating capacity is required, a number of vessels or cups, A, may be joined together by means of pipes connecting with the several oil-chambers D, arranged in any convenient form of group. In a single apparatus of large size it may be necessary to use a number of openings, F, for conducting air to the surface of the porous substance B. As a general thing, the use of an interior lining of clay, I, is advisable, on account of its being a non-conductor of heat; but it may, in some cases, be dispensed with, and the cement or porous substance may be placed within the metal cup or vessel A without any intervening lining.

Fig. 3 represents a modification of my device. Instead of metal, I construct the containing-vessel of clay, provided with the porous substance and supply-chamber as in the vessel A. In this case the inner or outer surface of the vessel should be glazed, so as to prevent the escape of oil from the vessel.

The degree of porosity of the cement burner may be varied according to the density of the hydrocarbon fuel to be used, but for ordinary use the following is recommended: Six parts of clay powder, six parts of fire-clay, and one part sawdust, all mixed and brought to a white heat by means of a process well known in pottery; or the burner may consist of pumice-stone—and it should be cemented in the cup or vessel A by gypsum, or with an iron or other suitable cement.

Suitable provision may be made for the escape of the gases formed in the interior of the vessel A, should the burner be too dense for the purpose, by means of a pipe, properly arranged within the supply-pipe or connected therewith, so that any back pressure or expansion of oil will cause the latter to flow back into the reservoir. Should the oil-chamber become clogged with tarry matter or deposit, the cement may be readily removed, and the chamber cleaned out.

The solid porous body which I employ as a burner is readily obtained in clay, gypsum, or cements containing these ingredients, and the oil or naphtha constituting the liquid fuel is readily absorbed by this body and brought to its surface.

In operation, the chamber D is filled with the hydrocarbon or other liquid fuel by means of the pipe E, leading from a conveniently-disposed reservoir. The pressure of the oil on the bottom of the porous substance, aided by capillary attraction, causes it to permeate this substance, and to ascend to its surface, when the flame is applied.

The apparatus above described forms a very convenient and serviceable device for heating purposes, and is applicable for use in the various industrial arts, in the laboratory, and for domestic purposes.

What I claim as my invention, and desire to secure by Letters Patent, is—

1. A hydrocarbon-heating apparatus, composed of a vessel, A, having a chamber or space, D, for the reception of liquid fuel, provided above the chamber, with a compact porous cement cover, and an internal air-space, F, substantially as and for the purpose described.

2. The combination of the vessel A, having a fuel-chamber, D, covered by a compact porous cement, an internal air-space, F, and an outer casing, G, all substantially as and for the purpose described.

In testimony whereof I have signed my name in the presence of two subscribing witnesses.

CLEMENT B. TOWER.

Witnesses:
J. H. ADAMS,
E. A. STOCK.